United States Patent Office 2,862,941
Patented Dec. 2, 1958

2,862,941

NON-SELECTIVE HYDROGENATION OF FATS AND OILS

Dwight R. Merker, Chicago, Ill., assignor to Swift & Company, Chicago, Ill., a corporation of Illinois No Drawing. Application August 11, 1955
Serial No. 527,859

12 Claims. (Cl. 260—409)

This invention relates to a process for treating oils and more particularly to a process of hydrogenating vegetable and animal oils to produce a partially hardened fat with an improved flavor stability and a wide range of plasticity.

Fatty materials, particularly glyceride oils intended for use in margarine or shortening are ordinarily hydrogenated to convert the liquid oils to semi-solid plastic fats which may be used in margarine or shortening manufacture. The liquid fatty material, a metallic catalyst and gaseous hydrogen are reacted under conditions of pressure, temperature and agitation that result in the addition of hydrogen at the points of unsaturation in the fatty acid portion of the glyceride molecule. Since the degree of hydrogenation can be determined by the amount of unsaturation remaining in the oil, iodine value is considered a good measure of the degree of hydrogenation. It is known that hydrogenation is preferential to the extent that certain unsaturated fatty acid radicals are saturated much more easily than others. In general it can be stated that, irrespective of the conditions of the reaction such as pressure, agitation, and temperature, the more unsaturated radicals will be hydrogenated more readily than those which contain fewer double bonds. The more "selective" the hydrogenation reaction, the greater will be the tendency for the more unsaturated radicals to add hydrogen in preference to the more saturated radicals. More specifically, those radicals containing a greater number of active methylene groups will add hydrogen more readily than more saturated acid chains.

In the hydrogenation of glyceride oils intended for ultimate use in the manufacture of margarine and shortening, it has been the practice heretofore to strive for increased selectivity in the hydrogenation process. The resultant plastic fat in which hydrogenation of monounsaturated acid radicals has been kept to a minimum, is blended with other hard or soft fats to produce an edible product of the desired consistency. It has now been found that by a process of non-selective hydrogenation, it is possible to adjust the hardness and plasticity of the hydrogenated material to any desired range and to produce a harder fat with a higher Wiley melting point, a higher setting point and a higher solid fat index for a given iodine value.

It is therefore an object of this invention to provide a process for treating animal and vegetable oils to produce a partially hardened oil having an improved range of plasticity.

Another object of this invention is to provide an adjustable non-selective method for hydrogenating glyceride oils.

A further object of this invention is to provide a partially hardened, edible plastic fatty material of increased flavor stability, low susceptibility to color reversion and a high degree of plasticity over a wide temperature range.

Still another object of the present invention is to provide a method for producing a wide plastic range edible fatty material having a higher melting point for a given iodine value.

A further object of this invention is to provide a method for producing a fatty product well adapted to the manufacture of margarine and shortening materials that obviates the necessity of blending to obtain desirable product consistency.

Additional objects, if not specifically set forth herein will be readily apparent to one skilled in the art from the following detailed description of the invention.

In accordance with the present invention a non-selective method of hydrogenating glyceride oils is provided wherein a very small amount of an acidic promoter is added to the oil just prior to hydrogenation. The acidic material which promotes the adjustable non-selectivity of the reaction is represented by mineral acids and organic acids.

More specifically, the present invention comprises adding a mineral acid such as dilute phosphoric or sulfuric acid, to a glyceride oil or mixtures thereof, and catalytically hydrogenating the mixture at conventional hydrogenation pressure and temperature to produce a partially hardened fat having good plasticity over a wide temperature range. Organic acids in aqueous solution such as citric acid, tartaric acid and other acids containing the same functional groups, especially those which are non-volatile, are also well suited to use as the promoter composition. The concentration and distribution of the acidic material are directly related to the range of plasticity since it has been found that the degree of the plastic range varies with the concentration of the promoter added prior to hydrogenation. Since the breadth of the range of plasticity is dependent upon the amount of promoter added, individual requirements with respect to the consistency desired in the final product will determine the amount of promoter necessary to produce a given product. It has been found, however, that an upper limit of around 0.10% of the promoter material by weight of refined oil is desirable, in order to avoid substantial poisoning of the catalyst. Larger amounts of the non-selectivity promoting agent are desirable when oils containing appreciable amounts of impurities are hydrogenated since the acidic promoter may be bound by impurities in the oil. Among other impurities in the oil with which the acid may react are peroxides, aldehydes, and ketones. The presence of such impurities requires a higher concentration of the promoter acid to produce the same degree of non-selectivity that is obtained when hydrogenating refined and deodorized oils. Although in the preferred form of the present invention deodorized oils have been non-selectively hardened, undeodorized oils may also be treated provided a sufficient excess of the acidic agent is added to react with impurities in the oil.

Although the compounds employed in the practice of this invention as promoters of non-selective hydrogenation have been reported to be catalyst poisons, the very slight poisoning effect is not particularly objectionable in view of the great advantage obtained in permitting adjustment of the plastic range merely by varying the concentration or distribution of the promoter. Moreover, partial poisoning of the catalyst tends to decrease the selectivity of the reaction in the manner desired. It should be noted, however, that the non-selective nature of the hydrogenation reaction is not appreciably dependent upon or directly related to catalyst poisoning. If the degree of non-selectivity depended only on catalyst poisoning, a reduction in the amount of catalyst employed should produce essentially the same type or degree of non-selective hydrogenation as that induced by the acidic promoters.

In order to show the effect of catalyst poisoning as compared to the effect of acidic promoters, a hydrogenation run was conducted using 0.025% catalyst in the absence of promoter rather than 0.1% catalyst with acid promoter as in the preferred examples set out hereafter. While only 20 to 40 minutes was required to hydrogenate to a given iodine value in the preferred examples, approximately 2 hours were required to hydrogenate the charge containing the reduced amount of catalyst to the same iodine value. Physical constants for the oil hardened in this manner differed substantially from those for oil hardened in the presence of small amounts of acid. Moreover, the degree of non-selectivity obtained under these conditions which simulate catalyst poisoning is only about 5–10% of that realized when the acidic promoters of the present invention are employed.

The following examples will serve to more clearly illustrate the process and products of the present invention.

EXAMPLE 1

An oil charge of 3000 grams of a blend of soybean oil (80%) and cottonseed oil (20%) was placed in a hydrogenator. Approximately 2 milliliters of a 10% aqueous citric acid solution was added to the oil charge and the mixture agitated for several minutes. An adsorbent composition containing 0.1% carbon and 0.1% dicalite was added to the acidified oil and the mixture heated to 135° C. after evacuation of the reaction vessel. About 0.1% nickel catalyst was then added and the charge heated to about 180°–200° C. After thirty minutes reaction time, with gaseous hydrogen at 20 p. s. i. pressure, the iodine number of the hydrogenated oil was 72.8. Analytical data for the products resulting from different concentrations of added citric acid are shown in Table I.

EXAMPLE 2

Two charges, one using the soybean-cottonseed oil blend of Example 1 and one using soybean oil alone were hydrogenated in a manner similar to Example 1 using tartaric acid as the promoter. Physical constants of the partially hardened products are set out in Table II.

EXAMPLE 3

Phosphoric acid (75% aqueous solution) was employed as the promoter in a hydrogenation reaction carried out in accordance with the conditions of Example 1. Table III shows the analytical data for the resultant products.

EXAMPLE 4

Products produced by typical runs carried out in a manner similar to that employed in Example 1 using a 50% aqueous solution of sulfuric acid as the promoter are set out in Table IV.

Because the hydrogenation proceeds in a non-selective course there is considerable formation of saturated glycerides as distinguished from selectively hardened oils. The percentage of polyunsaturated glycerides remaining in the partially hardened product is also higher than is present in hardened fatty materials produced by selective hydrogenation. It is the combination of these saturated and polyunsaturated glyceride molecules which accounts for the unexpected wide plastic range in the products of this invention. The percentage of unsaturated compounds in the non-selectively hardened oils of this invention is shown in the tables which follow.

Table I.—*Effect of citric acid (10% aqueous solution) on the hydrogenation of soybean oil (80%), cottonseed oil (20%) blend*

|  | Control | Citric acid promoter | | |
| --- | --- | --- | --- | --- |
|  |  | 0.05% | 0.067% | 0.1% |
| Iodine value | 76.3 | 74.6 | 72.8 | 80.9 |
| Softening point, °F | 81 | 102 | 112 | 126 |
| Wiley, °F | 92 | 107 | 116 | 128 |
| Setting point, °C | 26.4 | 29.7 | 34.4 | 39.7 |
| Melting point, °F | 94 | 111 | 122 | 131 |
| Solid fat index: |  |  |  |  |
| 50° F | 23.8 | 32.5 | 37.9 | 31.4 |
| 70° F | 12.2 | 21.0 | 29.1 | 28.2 |
| 80° F | 6.8 | 17.9 | 27.6 | 28.1 |
| 92° F | 1.1 | 9.0 | 18.9 | 23.5 |
| 100° F | 0.0 | 3.6 | 11.9 | 19.7 |
| Percent linoleic acid | 6.0 | 7.6 | 9.9 | 25.6 |
| Percent linolenic acid | 0.1 | 0.32 | 0.46 | 1.5 |
| Percent conjugated diene | 0.13 | 0.27 | 0.24 | 0.44 |
| Hydrogenation time (minutes) | 13 | 21 | 30 | 40 |

Table II.—*Effect of tartaric acid (10% aqueous solution) on the hydrogenation of vegetable oils*

|  | 80–20 soybean-cottonseed oil blend | | Soybean oil | |
| --- | --- | --- | --- | --- |
|  | Control | 0.067% soln. | Control | 0.067% soln. |
| Iodine value | 76.3 | 75.1 | 75.8 | 75.0 |
| Softening point, °F | 81 | 110 | 85 | 107 |
| Wiley, °F | 92 | 116 | 88 | 115 |
| Melting point, °F | 94 | 122 | 90 | 122 |
| Setting point, °C | 26.4 | 37.2 | 28.4 | 35.9 |
| Solid fat index: |  |  |  |  |
| 50° F | 23.8 | 34.4 | 33.0 | 34.4 |
| 70° F | 12.2 | 27.1 | 18.0 | 25.6 |
| 80° F | 6.8 | 25.0 | 10.2 | 23.1 |
| 92° F | 1.1 | 17.3 | 1.8 | 15.1 |
| 100° F | 0.0 | 11.3 | 0.4 | 9.1 |
| Percent linoleic acid | 6.0 | 10.7 | 2.2 | 8.5 |
| Percent linolenic acid | 0.1 | 0.83 | .01 | 0.57 |
| Percent conjugated diene | 0.13 | 0.39 | 1.1 | 0.26 |
| Hydrogenation time (minutes) | 13 | 34 | 21 | 28 |

Table III.—*Effect of phosphoric acid (75% aqueous solution) on the hydrogenation of soybean oil (80%), cottonseed oil (20%) blend*

|  | Phosphoric acid added | | | |
| --- | --- | --- | --- | --- |
|  | Control | 0.008% | 0.016% | 0.024% |
| Iodine value | 76.3 | 76.5 | 78.4 | 78.4 |
| Softening point, °F | 81 | 104 | 110 | 122 |
| Wiley, °F | 92 | 107 | 114 | 130 |
| Melting point, °F | 94 | 107 | 121 | 137 |
| Setting point, °C | 26.4 | 29.5 | 35.3 | 43.5 |
| Solid fat index: |  |  |  |  |
| 50° F | 23.8 | 27.5 | 28.8 | 33.8 |
| 70° F | 12.2 | 16.4 | 24.4 | 32.2 |
| 80° F | 6.8 | 12.4 | 22.4 | 30.8 |
| 92° F | 1.1 | 5.1 | 16.4 | 28.2 |
| 100° F | 0.0 | 1.3 | 11.4 | 26.3 |
| Percent linoleic acid | 6.0 | 9.5 | 12.0 | 18.5 |
| Percent linolenic acid | 0.1 | 0.8 | 1.1 | 1.7 |
| Percent conjugated diene | 0.13 | 0.20 | 0.24 | 0.5 |
| Hydrogenation time (minutes) | 13 | 18 | 28 | 50 |

Table IV.—*Effect of sulfuric acid (50% aqueous solution) on the hydrogenation of soybean oil*

|  | Control | 0.021% acid added |
| --- | --- | --- |
| Iodine value | 75.8 | 76.6 |
| Softening point, °F | 85 | 115 |
| Wiley, °F | 88 | 118 |
| Melting point, °F | 90 | 123 |
| Setting point, °C | 28.4 | 35.6 |
| Solid fat index: |  |  |
| 50° F | 33.0 | 42.2 |
| 70° F | 18.0 | 33.4 |
| 80° F | 10.2 | 30.1 |
| 92° F | 1.8 | 20.6 |
| 100° F | 0.0 | 13.3 |
| Percent linoleic acid | 2.2 | 4.7 |
| Percent linolenic acid | .01 | 0.49 |
| Percent conjugated diene | 1.1 | 1.9 |
| Hydrogenation time (minutes) | 21 | 35 |

The sequence of steps for the addition of the reactants to the hydrogenator is not limited to that shown in Example 1. The order may be interchanged or the constituents may be admixed with oil and the mixture employed as a stock solution for subsequent addition to charges in the hydrogenator. The temperature at which the promoter and catalyst are added to the oil may be varied substantially provided sufficient moisture is present.

In order to show the effect of removing impurities by deodorization prior to hydrogenation and also to illustrate a variation in the manner in which the constituents are added to the hydrogenator, the hydrogenation described in Example 5 was run:

EXAMPLE 5

Approximately 2 milliliters of a 10% aqueous citric acid solution was added to 100 grams of deodorized oil (80% soybean, 20% cottonseed). An adsorbent composition of 1.5 grams carbon and 1.5 grams filter aid was added and the entire mixture agitated during heating to about 80° C. After the addition of 3 grams of nickel catalyst (Rufert), the agitation was continued for 15 minutes. The stock mixture was then added to a hydrogenator containing 2900 grams of deodorized oil (80% soybean, 20% cottonseed). The hydrogenator was evacuated, agitated, and heated to 190° C. The charge was then hydrogenated at 20 p. s. i. for 28 minutes. The product had the following physical constants:

| | |
|---|---|
| Iodine value | 73.4 |
| Softening point, °F | 126 |
| Wiley, °F | 132 |
| Setting point, °C | 44.6 |
| Melting point, °F | 133 |
| Solid content index: | |
|     50° F | 36.2 |
|     70° F | 32.1 |
|     80° F | 31.5 |
|     92° F | 27.1 |
|     100° F | 22.2 |
| Percent linoleic acid | 15.0 |
| Percent linolenic acid | 1.1 |
| Percent conjugated diene | 0.54 |

A comparison of the analytical data for the product of the foregoing example in which 0.067% citric acid was used as the promoter, with that set out for a like amount of this promoter in Table I shows the marked advantage obtainable by the removal of traces of impurities prior to hydrogenation.

From the above tables, it can be seen that a method is herein disclosed by which hardness and plastic range of any fatty material can be adjusted within predetermined limits merely by altering the concentration or distribution of the acidic promoter employed in the hydrogenation reaction. For any given iodine value a fat of increased hardness, higher melting point and a broader range of plasticity may be prepared. The degree of polyunsaturation also increases as the amount of promoter employed is increased. The quantitative effect of the promoter on the selectivity of the reaction is best illustrated by the data in Table III. As the amount of promoter employed in the hydrogenation reaction increases, although the iodine value remains relatively constant, the melting point and setting point increase as does the solid content index. It is possible therefore to simulate blended oil such as is used in margarine and shortening manufacture by a one step hydrogenation method. Distribution of the promoter may be altered by use of various inactive adsorbents.

The hydrogenation process may be carried out in the usual manner using any of the well known metallic hydrogenation catalysts such as finely divided nickel or nickel-copper. Although in the examples disclosed herein only soybean and cottonseed oils have been hydrogenated, any of the numerous animal or vegetable glyceride materials known to the art may be hydrogenated by the method of the present invention.

The effect of altering the course of hydrogenation to improve the plastic range has been achieved using only trace amounts of the promoter. At normal hydrogenation temperatures and pressures there is not only an absence of any noticeable deleterious effect of the acidic promoters on the oil, but rather an improvement in flavor stability of oils hardened in accordance with this invention. Oil hydrogenated in the presence of trace amounts of acid, bleached and deodorized, retains good flavor and odor undiminished for a long period of time. Even upon long standing, the odor and flavor that develop are typical of rancidity rather than reversion.

Obviously, many modifications of the invention hereinbefore set forth may be made without departing from the spirit and scope thereof, and therefore only such limitations should be imposed as are indicated in the appended claims.

I claim:

1. A non-selective hydrogenation process for hardening a glyceride oil to produce a partially hardened fat of improved flavor stability and wide plastic range which comprises: incorporating in said glyceride oil in the presence of moisture prior to hydrogenation a small but effective amount of a material selected from the group consisting of mineral acids and aliphatic hydroxy acids.

2. A non-selective hydrogenation process for hardening a glyceride oil to produce a partially hardened fat of improved flavor stability and wide plastic range which comprises: incorporating in said glyceride oil prior to hydrogenation a small but effective amount of an aqueous solution of a mineral acid.

3. The process of claim 2 wherein the mineral acid is sulfuric acid.

4. The process of claim 2 wherein the mineral acid is phosphoric acid.

5. A non-selective hydrogenation process for hardening a glyceride oil to produce a partially hardened fat of improved flavor stability and wide plastic range which comprises: incorporating in said glyceride oil prior to hydrogenation a small but effective amount of an aqueous solution of an aliphatic hydroxy acid.

6. The process of claim 5 wherein the aliphatic hydroxy acid is citric acid.

7. The process of claim 5 wherein the aliphatic hydroxy acid is tartaric acid.

8. A non-selective hydrogenation process for hardening a glyceride oil to produce a partially hardened fat of improved flavor stability and wide plastic range which comprises: incorporating in said glyceride oil in the presence of moisture prior to hydrogenation in an amount not substantially in excess of 0.1% by weight of the glyceride of a material selected from the group consisting of mineral acids and aliphatic acids.

9. A partially hardened fat suitable for shortening prepared by the non-selective hydrogenation of a glyceride oil in the presence of a small amount of an aqueous solution of a material selected from the group consisting of mineral acids and aliphatic hydroxy acids, said fat having an iodine value of from 72 to 81, a solid content index of at least 4% at 100° F. and a melting point of at least 110° F.

10. A partially hardened fat suitable for margarine prepared by the non-selective hydrogenation of a glyceride oil in the presence of a small amount of an aqueous solution of a material selected from the group consisting of mineral acids and aliphatic hydroxy acids, said fat having an iodine value of from 76 to 80, a solid content index of not more than 1.5% at 100° F. and a melting point of not more than 104° F.

11. A method for producing an edible fatty material of improved flavor stability having a wide range of plasticity which comprises: hydrogenating a refined deodorized glyceride material in the presence of a small amount of a material selected from the group consisting of mineral acids and aliphatic hydroxy acids in an aqueous carrier.

12. A non-selective hydrogenation process for hardening a glyceride oil to produce a partially hardened fat of improved flavor stability and wide plastic range which comprises: incorporating in said glyceride oil prior to hydrogenation in an amount not substantially in excess of about 0.1 percent by weight of the glyceride of an aliphatic hydroxy acid in an aqueous carrier.

References Cited in the file of this patent

UNITED STATES PATENTS

| | | |
|---|---|---|
| 1,211,704 | Higgins | Jan. 9, 1917 |
| 1,605,108 | Grindrod | Nov. 2, 1926 |

OTHER REFERENCES

Bailey; Industrial Oil & Fat Products (second edition), pp. 698, 699 and 716.